Oct. 31, 1967 W. G. WALKER 3,350,658

OSCILLATOR DRIFT COMPENSATION

Filed May 19, 1966 3 Sheets-Sheet 1

INVENTOR.
WINSTON G. WALKER
BY White & Haefliger
ATTORNEYS.

INVENTOR.
WINSTON G. WALKER
BY White & Haefliger
ATTORNEYS.

FIG. 4.
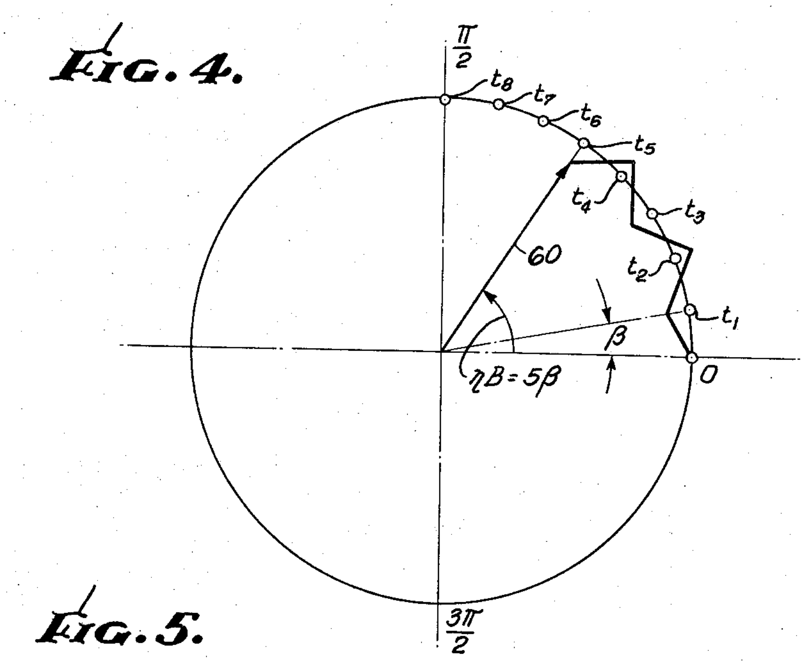
FIG. 5.
| VECTOR 60 POSITIONS | SECONDARY SWITCHES OPEN | SECONDARY SWITCHES CLOSED |
|---|---|---|
| $t_0$ | 54, 55, 56 | 51, 52, 53 |
| $t_1$ | 54, 55 | 51, 52, 53 |
| $t_2$ | 54, 56 | 51, 53 |
| $t_3$ | 54 | 51, 52 |
| $t_4$ | 56 | 51, 52 |
| $t_5$ | 51 | 54, 55 |
| $t_6$ | 51, 53 | 54, 55 |
| $t_7$ | 51, 52 | 54, 55, 56 |
| $t_8$ | 51, 52, 53 | 54, 55, 56 |
FIG. 6.
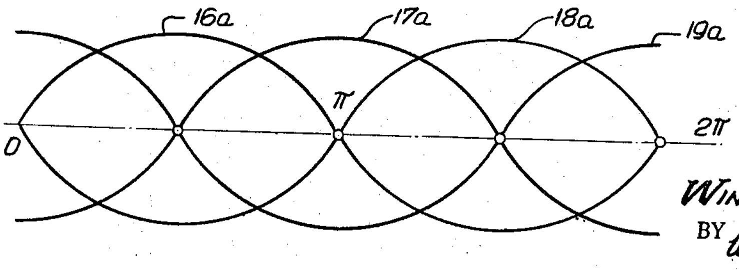
INVENTOR.
WINSTON G. WALKER
BY White & Haefliger
ATTORNEYS.

United States Patent Office 3,350,658

Patented Oct. 31, 1967

3,350,658

OSCILLATOR DRIFT COMPENSATION

Winston G. Walker, Santa Ana, Calif., assignor to Astrodata, Inc., Anaheim, Calif., a corporation of California Filed May 19, 1966, Ser. No. 551,460
8 Claims. (Cl. 331—17)

ABSTRACT OF THE DISCLOSURE

The disclosed invention concerns highly accurate control of oscillator drift, during use of a standard frequency generator and after removal of the standard.

This invention relates generally to oscillator drift compensation, and more particularly concerns highly accurate control of oscillator drift during use of a standard frequency generator, and after removal of the standard.

It is a major object of the invention to provide an oscillator or clock that is drift compensated in such a way as to remain highly accurate over extended periods of time. For example, the invention makes possible drift rates as low as one part in one billion parts, per day, in the absence of connection to a frequency standard, through the provision of unusual methods of drift compensation as well as unusual drift compensation apparatus. Such oscillators are needed for example in the fields of military and space communications and telemetry.

The basic method of the invention includes the steps of operating a generator to produce a signal frequency $f_1$ to derive a compensated output version of $f_o$ of $f_1$, comparing $f_o$ with the output $f_1$ of a frequency standard to derive a first error signal related to the drift, using the error signal in the operation upon $f_1$ in such manner as to alter $f_o$ for reducing the error signal, generating a maintainable correction signal corresponding to a time derivative of the error signal, and also using the correction signal in the operation upon $f_1$. Accordingly, when the standard is removed and the error signal no longer is derived, the correction signal is maintained to operate upon $f_1$ so as to correct for drift.

In a preferred step of operating upon $f_1$ to derive $f_o$, multiple output signals of frequency $f_1$ are produced as by a phase splitter, with the signals phase displaced so as to cancel if added; the multiple output signals are then variably amplitude modulated as a function of the above described error signal; and thereafter the amplitude modulated signals are combined to produce a phase modulated side band signal $f_o$, i.e. the compensated output version $f_o$ of $f_1$.

Regarding the maintainable correction signal, it typically corresponds to substantially the first derivative with respect to time of the error signal, and it is used along with the principal error signal in the compensating operation upon $f_1$. Further, for even higher accuracy and better response, the invention contemplates that the maintainable correction signal may be made to correspond to substantially the second as well as the first derivatives with respect to time of the principal error signal.

In its basic apparatus aspects, the invention contemplates the provision of a generator to produce a signal frequency $f_1$ subject to drift, means operating upon $f_1$ to derive a compensated version $f_o$ of $f_1$, means to compare $f_o$ with the output $f_1$ of a frequency standard to derive a first error signal related to the drift, and feedback channel means to transmit a version of the error signal to the operating means in compensating relation so as to alter $f_o$ for reducing the error signal and to generate and transmit to the operating means a maintainable correction signal corresponding to a time derivative of the error signal. Typically, the operating means may preferably include phase shifting means responsive to the received signal frequency $f_1$ to produce multiple outputs of frequency $f_1$ and respectively phase displaced so as to cancel if added, and means connected to be responsive to the error signal for selectively passing and variably amplitude modulating the multiple output signals and thereafter combining the amplitude modulated signals to produce the compensated output version $f_o$.

The above referred to feedback channel means may include means to generate and transmit maintainable correction signals as described above in connection with the method aspects of the invention. Further, the first and second derivative generators may comprise variable pulse rate generators used in the unusually advantageous way or ways to be described in greater detail.

These and other objects and advantages of the invention, as well as the details of illustrative embodiments, will be more fully understood from the following detailed description of the drawings in which:

FIG. 4 illustrates a phase diagram showing division of the modulating or error signal into angular increments corresponding to variable control of the switches;

FIG. 5 is a tabulation correlating the FIG. 4 increments with switch closure; and FIG. 6 is a diagram showing four output signals produced from the carrier.

Figure 1:
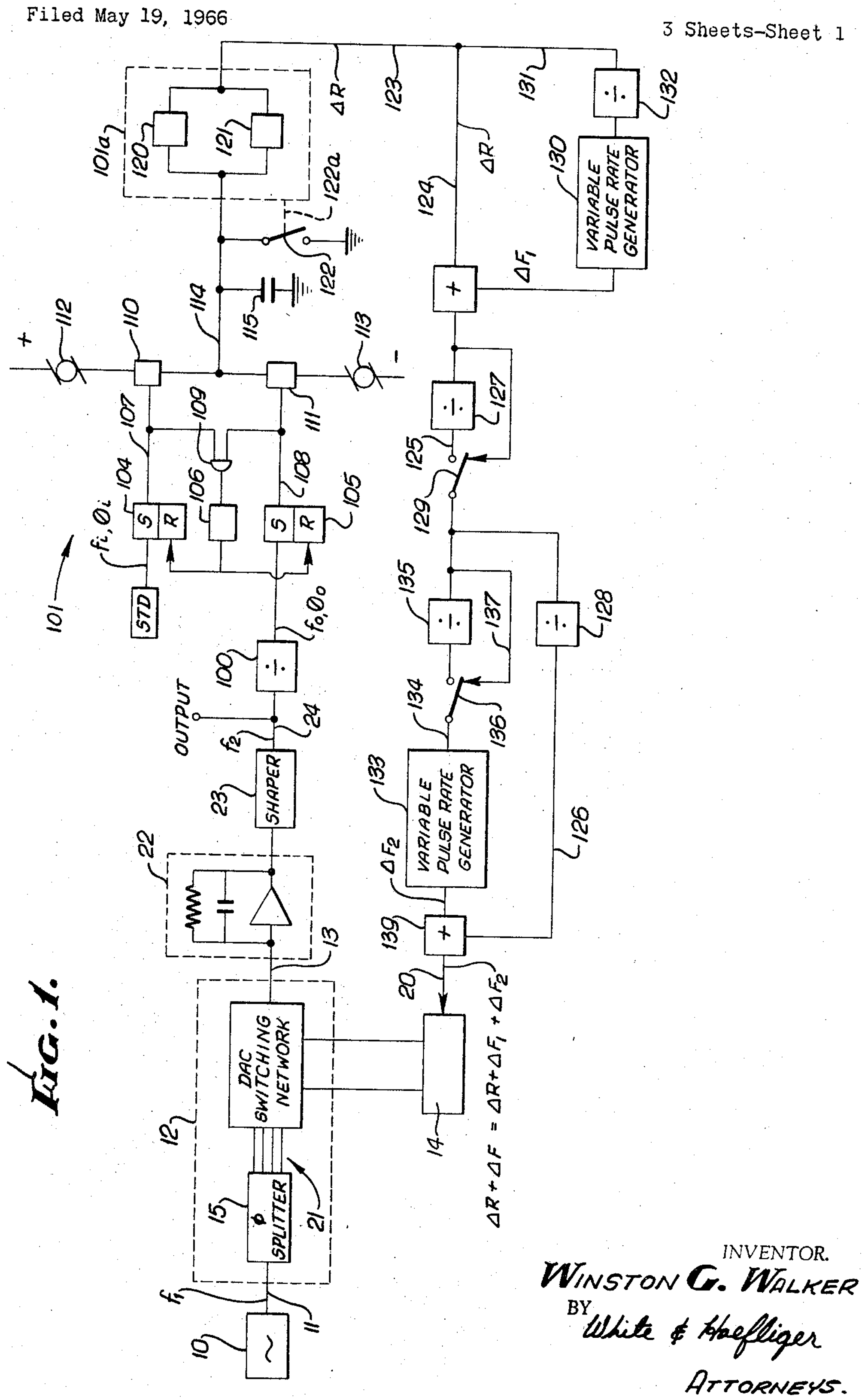
FIG. 1 is a functional block diagram showing one form of oscillator drift compensation system incorporating the invention.

Referring first to FIG. 1, a carrier signal source is indicated generally at 10, and may for example include a crystal controlled oscillator or clock. The signal output from the source is indicated at 11, and may typically have generally sinusoidal wave form:

$$A \sin \omega_1 t \quad (1)$$

the frequency of which may for example be in the megacycle range, and is defined as:

$$f_1=\frac{\omega_1}{2\pi} \quad (2)$$

It is desired to accurately compensate for any slight frequency or phase drift of the output of 10, and for this purpose the signal 11 is passed to a phase modulator 12 which operates upon the input 11 to produce an output 13 version of $f_1$ which may typically have the form:

$$A_n(t) \sin (\omega_1+\omega_2)t \quad (3)$$

the frequency of which is defined as $$f_2=\frac{\omega_1+\omega_2}{2\pi}=f_1+K_3(\Delta R+\Delta F) \quad (4)$$

As an example, $f_1$ may be $10^6$ cycles per second and it may drift at rates greater than 1 part in $10^9$ per day. In this regard, a modulator control 14 operates to control the modulator 12 in the manner to be later described, the control having at 20 an error signal input, which may include components ΔR and ΔF to be described.

The modeulator 12 may be considered to include phase shifting or splitter means 15 responsive to a received carrier input signal 11 to produce multiple output signals of the same frequency but respectively phase displaced so as to cancel if added together. Such signals are transmitted by parallel channels generally indicated at 21, but specifically illustrated as channels 16–19 in FIG. 2 for the case where the signals are phase displaced at 90 degree intervals. As to the latter case, FIG. 6 shows four typical channel signals 16a, 17a, 18a and 19a in the case where they may have sinusoidal form, although numbers of channels other than four and signal wave forms other than sinusoidal are contemplated. Also, phase displacement of the signals may be other than 90 degrees.

Further in accordance with the invention, the modulator 12 and control 14 may be considered to include means connected to be responsive to the error signal at 20 for selectively passing and variably amplitude modulating different of the output signals transmitted by channels 21 and thereafter combining the amplitude modulated signals to produce a suppressed carrier, phase modulated single side band signal for transmission at 13. That signal may be filtered at 22 to remove high frequency components introduced by the modulator switching, and limited at 23 to produce a single side band phase modulated square wave at output $f_2$ 24. A one pole filter is shown, although filters of other configurations are contemplated.

Figure 2:
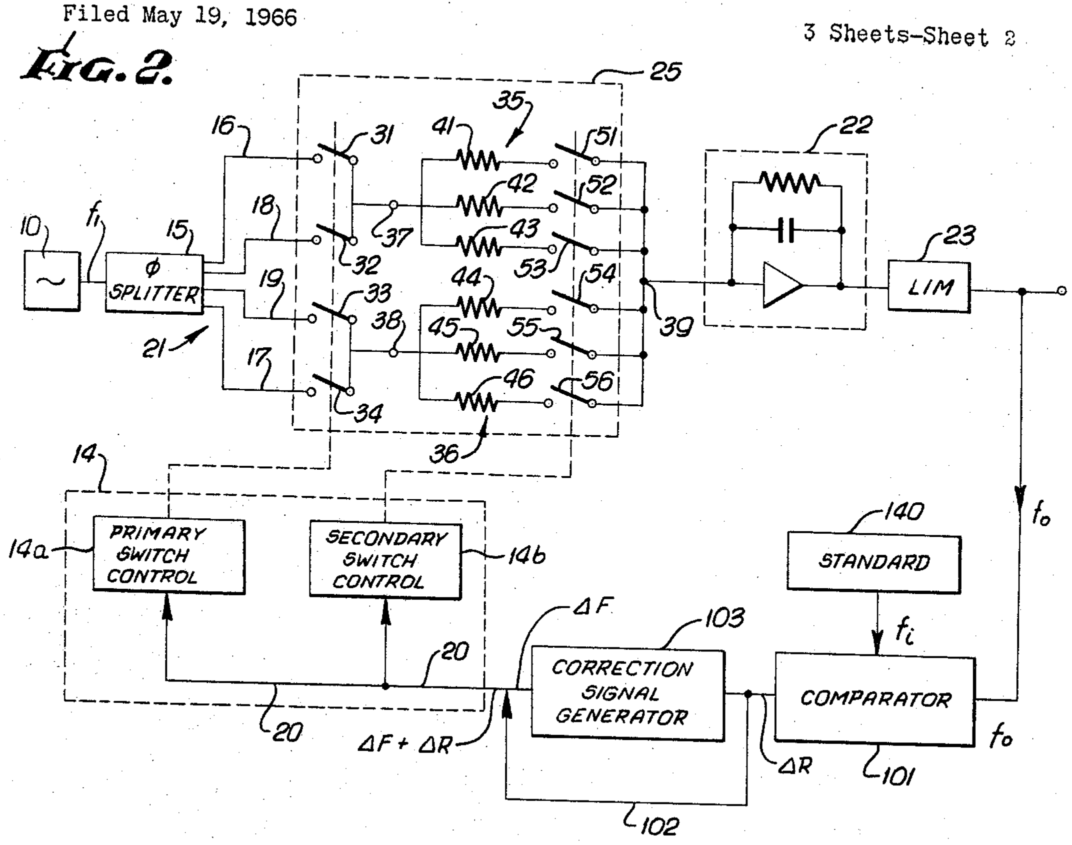
FIG. 2 illustrates circuit mechanization of that portion of FIG. 1 which operates upon $f_1$ to derive $f_o$.

In the form of the invention illustrated in FIG. 2, the above means last referred to includes an attenuator network 25 having parallel resistors and parallel switches connected to selectively pass and variably attenuate different of the signals transmitted via channels 21. For example, as seen in FIG. 2, there are parallel primary switches 31–34, and resistors and switches defining first and second parallel banks 35 and 36. Bank 35 includes three parallel branches with a common input terminal 37, and bank 36 has three parallel branches with a common input terminal 38. A summing junction 39 provides a common output terminal for the branches of both banks 35 and 36 in network 25. Each branch in the banks includes a resistor and a switch connected in series, the resistors being designated at 41–46, and the switches (called secondary switches) being indicated at 51–56.

The primary switches 31 and 32 are arranged to selectively connect and disconnect two of the phase shifter output signals, for example 16a and 18a, with the common input terminal 37 of bank 35, and primary switches 33 and 34 are arranged to selectively connect and disconnect two of the phase shifter output signals, for example 19a and 17a with the common input terminal 38 of bank 36. Switch control means 14a and 14b are responsive to the error signal at 20 to operate the primary switches 31–34 and secondary switches 51–56 respectively.

To better understand the operation of the FIG. 2 circuit, it will be understood that expression (3) above may be written as follows:

$$A_n(t)\sin(\omega_1+\omega_2)t_n = A_n(t)[\sin\omega_1 t_n \cos n\beta + \cos\omega_1 t_n \sin n\beta] \quad (5)$$

where, $A_n(t)$=amplitude of output at 13, which is a function of time, and is represented by the length of vector in FIG. 4

$$t_n = \frac{n}{Nf_2}$$

$\beta$=angle between arbitrary equal time intervals $t_1-t_o$, $t_2-t_1$, etc.

$$N = \frac{2\pi}{\beta}$$

$n\beta$=the angular displacement of modulating signal vector 60 at $t_n$ $$f_2 = \frac{\omega_2}{N\beta}$$

In other words, looking at the right hand side of Equation 5, it is seen that the amount of the carrier component 16a designated as $A_n(t)\sin\omega_1 t$ to be included in the output at time $t_n$ is represented by the expression $\cos n\beta$ and the amount of the carrier component 19a designated as $A_n(t)\cos\omega_1 t$ to be included in the output at time $t_n$ is represented by the expression $\sin n\beta$.

Further, the desired phase modulation $\omega_2$ to correct for drift is seen to be derived by selective inclusion of the resistors 41–46 momentarily switched into signal passing and attenuating relation to the signals 16a–19a.

In FIG. 4, the modulating frequency $f_2$ is assumed for purposes of illustration to be one cycle per second, represented by the vector 60 sweeping counterclockwise through 360 degrees in one second. Various secondary switches of attenuator network 25 are operated by the control 14 at $\frac{1}{32}$ intervals, so that in the interval 0 to $\pi/2$ in FIG. 4 various of switches 51–56 of FIG. 2 will be operated at each of the vector angles represented by the times $t_o, t_1, \ldots t_8$. Various of secondary switches 51–56 will also be operated at $\frac{1}{32}$ second intervals as the vector 60 sweeps through the remaining quadrants of the FIG. 4 circle. On the other hand, the open or closed states of the primary switches of network 25 are tabulated as follows:

| Vector 60 position | Primary Switches Open | Primary Switches Closed |
|---|---|---|
| 0 to 90° | 32 and 34 | 31 and 33 |
| 90° to 180° | 31 and 34 | 32 and 33 |
| 180° to 270° | 31 and 33 | 32 and 34 |
| 270° to 360° | 32 and 33 | 31 and 34 |

Thus, switches 31–34 are variously operated each quarter second as vector 60 arrives at 90°, 180°, 270° and 360° positions. Also in FIGS. 2–5, the values of the resistors 41 to 46 are as follows, giving the proper weighting or attenuation in various combinations:

| Resistor: | Unit of resistance |
|---|---|
| 41 | 1 |
| 42 | 2 |
| 43 | 4 |
| 44 | 1 |
| 45 | 2 |
| 46 | 4 |

In FIG. 5 are tabulated the open or closed states of the secondary switches 51–56 at vector angular positions $t_o \ldots t_8$ in the first quadrant. Switch positions for corcorresponding vector positions in the remaining quadants may be similarly determined. In general, the number of primary and secondary switches and resistors may be correlated to the selected time increment sampling of the phase split input signals.

Generally speaking, the value of the amplitude term $A(t)$ in Equation 5 will fluctuate somewhat in value due to the discretely incremental or digital type functioning of the attenuator 25 as various of the switches are operated at each of the vector time positions $t_o \ldots t_8$, etc. This fluctuation results in the "star" pattern traced by the tip of vector 60 in FIG. 4. Limiter 23 removes these amplitude fluctuations, leaving the square wave axis crossings as the phase modulation on the signal $f_2$. Low pass filter 22 is used to eliminate switching transients, i.e. it smooths the output.

Figure 3:
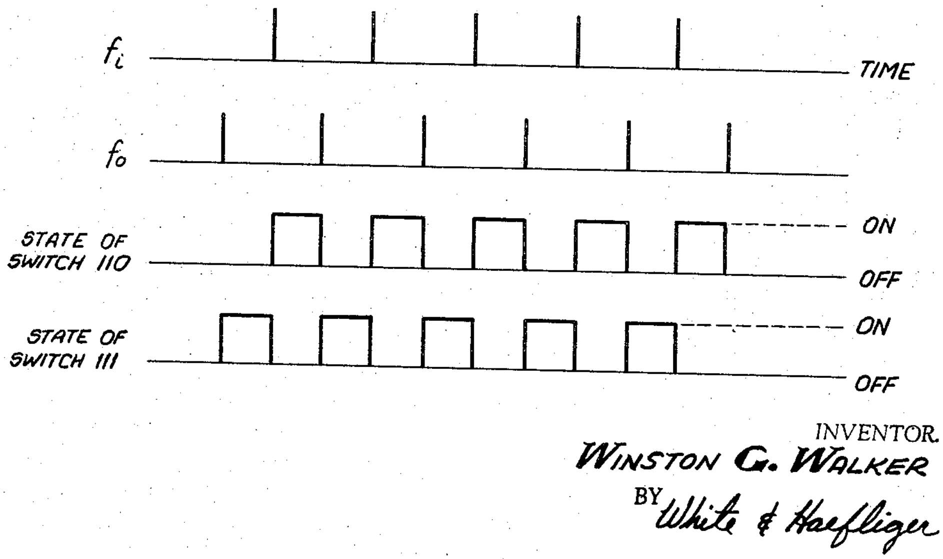
FIG. 3 shows the manner in which compensated ($f_o$) and standard ($f_1$) pulses may be compared to derive a first error signal.

The phase shifter network 15 is known in the art. Also, the switches 31–34 and 51–56 may be electronic, and may be suitably controlled at 14. Limiter 23 is standard, and the filter 22 may include a DC amplifier with feedback capacitance and resistance as indicated in FIG. 3.

The signal $f_2$ at 24 in FIG. 1 is next divided at 100 to produce the version $f_o$ of $f_2$, the latter being a compensated version of $f_1$ as will now be described. Referring briefly to FIG. 2, $f_o$ is compared as by comparator device 101 with the output $f_1$ of a frequency standard 140 to derive a first error signal $\Delta R$ related to the drift of $f_1$; thereafter the error signal is used in the operation upon $f_1$ (as by controlling the modulator 25) in such manner as to alter $f_o$ for reducing the error signal ΔR. In this regard, the error signal ΔR, may be directly passed at 102 to the switch controls 14a and 14b; however block 103 in FIG. 2 broadly signifies the apparatus and step of generating a usable and maintainable correction signal ΔF in response to ΔR input. The correction signal ΔF may thus be passed to the switch controls 14a and 14b along with the error signal ΔR, so that when the standard frequency $f_i$ to the comparator 101 is removed, the maintained correction signal ΔF will continue to be transmitted to the controls 14a and 14b for much more accurate drift compensation as respects $f_1$.

Referring back to FIG. 1, the comparator indicated generally at 101 is in the form of a phase detector to repeatedly and quantitatively sample the phase difference $|\phi_i-\phi_o|$ or error between $f_i$ and $f_o$. The particular sampling apparatus illustrated includes flip-flops 104 and 105 which are adapted to be set by positive going axis crossings of the signals of frequencies $f_i$ and $f_o$ respectively. In addition, a reset driver 106 has its output connected with the reset inputs of the flip-flops, and its input connected with the flip-flop output leads 107 and 108 through an AND gate 109. The flip-flop outputs control current switches 110 and 111 connected with positive and negative current sources 112 and 113. The operation is such that the amount of positive or negative current transmitted at 114 in charging or discharging relation to the capacitor 115 is controlled by the phase difference $\phi_i-\phi_o$ or $\phi_o-\phi_i$ between $f_o$ and $f_i$, as is also indicated in FIG. 3.

The voltage $V_o$ at the capacitor is applied to the comparator 101a, which establishes up and down threshold voltage levels at 120 and 121. Each time the capacitor voltage increases or decreases to the up or down threshold levels, the comparator produces an error pulse, and the pulse train so produced corresponds to the error signal ΔR and has a frequency substantially proportional to the phase difference $|\phi_i-\phi_o|$. If that phase difference is relatively small, it will take longer to charge or discharge the capacitor 115 to threshold level, so that the frequency of the error signal ΔR will be relatively lower, and vice versa. Switch 122 is suitably operated as indicated at 122a to discharge the capacitor each time the capacitor voltage arrives at an up or down (positive or negative) threshold level.

The error signal ΔR is directly applied via feedback paths 123, 124, 125, 126 and 20 to the switch control 14, through suitable dividers 127 and 128 and through a suitable slew (acquisition) and track (operate) switch 129. The latter in slew-mode by-passes ΔR around divider 127. In this regard, the feedback connection to the control 14 is such as to alter $f_o$ for reducing the error signal ΔR, as for example reducing its frequency; however, assuming the removal of the frequency standard ΔR will not exist, and $f_i$ will resume its slow drift rate in the absence of what will next be described in the feedback channels.

As previously mentioned in the introduction, the invention further contemplates generating a maintainable correction signal ΔF corresponding to a time derivative of the error signal ΔR, and using the correction signal in the compensating operation upon $f_1$. For example, the feedback channel means includes means to generate and transmit the correction signal $\Delta F_1$, corresponding to the first derivative with respect to time of the error signal, and expressed as follows:

$$\Delta F_1=K_1\frac{d(|\phi_i-\phi_o|)}{dt} \qquad (6)$$

As one example, a variable pulse rate generator 130 is connected in feedback leg 131 along with a suitable divider 132, the generator generating the maintainable first derivative for application to the control 14. The maintainable correction signal may also include another term $\Delta F_2$ corresponding to the second derivative with respect to time of the error signal, as expressed as follows:

$$\Delta F_2=K_2\frac{d^2(|\phi_i-\phi_o|)}{dt^2} \qquad (7)$$

As one example, another variable pulse rate generator 133 is connected in feedback leg 134, along with a suitable divider 135, the generator generating the maintainable second derivative for application to the control 14. Since leg 134 is in series with leg 131, variable pulse rate generator 133 operates upon the first derivative output of variable pulse rate generator 130. A suitable switch 136 is operable in track mode to connect divider 135 in series with generator 133, or in slew (acquisition) mode to by-pass the divider via path 137.

Leg 126 by-passes ΔR and ΔF, around the leg 134, so that at the sum location 139, the error and correction signals ΔR, $\Delta F_1$ and $\Delta F_2$ are added for application at 20 to the control 14. When ΔR is removed as a result of removal of the comparison standard 140 source of $f_i$, the correction signals $\Delta F_1$ and $\Delta F_2$ will be maintained and applied to the control 14 to keep $f_1$ from drifting, or otherwise greatly inhibit its drifting relative to $f_i$. In other words, the influence of $f_i$ will long remain, even though it is removed. This result has great importance, as for example in regard to maintaining oscillators on board satellites in "driftless" condition, after their disconnection from frequency standards on earth prior to launch.

I claim:

1. In apparatus of the character described, a generator to produce a signal frequency $f_1$ subject to drift, phase splitting means responsive to the received signal frequency $f_1$ to produce multiple outputs of frequency $f_1$ respectively phase displaced so as to cancel if added, means connected to be responsive to an error signal for selectively passing and variably amplitude modulating different of said multiple output signals and thereafter combining the amplitude modulated signals to produce a version $f_o$ of $f_1$, and means to compare $f_o$ with the output of a frequency standard to derive said error signal.

2. Apparatus of the character described, comprising a generator to produce a signal frequency $f_1$ subject to drift, means operating upon said produced signal frequency $f_1$ to derive a version $f_o$ of $f_1$, means to compare $f_o$ with the output $f_i$ of a frequency standard to derive a first error signal related to said drift, and feedback channel means to transmit a version of said error signal to said operating means in compensating relation to alter $f_o$ for reducing said error signal and to generate and transmit to said operating means maintainable correction signal corresponding to a time derivative of said error signal, said operating means including phase shifting means responsive to the received signal frequency $f_1$ to produce multiple outputs of frequency $f_1$ and respectively phase displaced so as to cancel if added, and means connected to be responsive to said error signal for selectively passing and variably amplitude modulating different of said multiple output signals and thereafter combining the amplitude modulated signals to produce said version $f_o$.

3. Apparatus as defined in claim 2 in which said feedback channel means includes means to generate and transmit said correction signal corresponding to substantially the first derivative with respect to time of said error signal.

4. Apparatus as defined in claim 3 in which said feedback channel means includes means to generate and transmit said correction signal corresponding to substantially the first and second derivatives with respect to time of said error signal.

5. Apparatus as defined in claim 3 in which said correction signal generating means comprises a variable pulse rate generator.

6. Apparatus as defined in claim 4 in which said first and second derivative correction signal generating means comprise variable pulse rate generators.

7. Apparatus as defined in claim 2 in which said means for selectively passing and variably amplitude modulating different of said multiple output signals includes a network having parallel resistors and parallel switches.

8. Apparatus as defined in claim 7 in which said operating means includes switch control means responsive to said version of the error signal to operate said network switches in controlled sequence.

References Cited

UNITED STATES PATENTS

| | | | |
|---|---|---|---|
| 2,972,720 | 2/1961 | Hume | 331—4 |
| 3,076,943 | 2/1963 | Cooperman | 331—36 |

ROY LAKE, *Primary Examiner.*

JOHN KOMINSKI, *Examiner.*